United States Patent [19]

Fujimoto

[11] 3,737,875

[45] June 5, 1973

[54] DEVICE FOR SELECTING INFORMATION

[75] Inventor: Sakae Fujimoto, Tokyo, Japan

[73] Assignee: Kabushiki Kaisha Ricoh, Tokyo, Japan

[22] Filed: Sept. 30, 1971

[21] Appl. No.: 185,415

Related U.S. Application Data

[63] Continuation of Ser. No. 813,035, April 3, 1969, abandoned.

[30] Foreign Application Priority Data

Apr. 13, 1968 Japan ....................43/24622
Apr. 13, 1968 Japan ....................43/24623

[52] U.S. Cl. ....................340/173 LM, 179/100.3 B, 179/100.1 R

[51] Int. Cl. ....................G11c 11/42, G11b 7/00

[58] Field of Search ....................340/173 LM; 179/100.2 B, 100.1 R; 74/569

[56] References Cited

UNITED STATES PATENTS

| | | | |
|---|---|---|---|
| 1,791,039 | 2/1931 | Owens | 179/100.3 |
| 2,468,198 | 4/1949 | Heller | 179/100.2 |
| 3,506,806 | 4/1970 | Hawkins et al. | 340/173 |
| 3,509,543 | 4/1970 | Lee et al. | 340/173 |
| 3,255,782 | 6/1966 | Fend | 74/569 |
| 3,084,334 | 4/1963 | Martin et al. | 340/173 |
| 3,106,700 | 10/1963 | Newberry | 340/173 |

FOREIGN PATENTS OR APPLICATIONS

| | | | |
|---|---|---|---|
| 811,625 | 8/1951 | Germany | 179/100.3 |

*Primary Examiner*—Stanley M. Urynowicz, Jr.
*Attorney*—Burgess, Ryan and Wayne

[57] ABSTRACT

An information selecting device having information stored in rows and columns in a storage medium. Wheels drive the medium in increments according to pulses from a command unit. This same unit sends pulses to a movable selection plate having apertures therein to select information from the medium.

1 Claim, 3 Drawing Figures

INVENTOR

SAKAE FUJIMOTO

BY Burgess, Ryan & Hicks
ATTORNEYS

INVENTOR

SAKAE FUJIMOTO

BY Burgess, Ryan + Hicks
ATTORNEYS

DEVICE FOR SELECTING INFORMATION

This application is a continuation of Ser. No. 813,035, filed Apr. 3, 1969, now abandoned.

BACKGROUND OF THE INVENTION

The present invention relates to a device for selecting information and more particularly to a device for selecting information which is stored in predetermined size and in rows and columns in an information storage medium.

Known in the art is a device for selecting required information from the information which is stored in an information storage medium in rows and columns in a predetermined information unit size. However, they are very complicated in construction and mechanism and inefficient in operation so that access to information with satisfactory speed and accuracy cannot be expected.

The primary object of the present invention is therefore to provide a device for selecting information which can eliminate the defects in the conventional device and can select information with speed and accuracy yet with a simple construction.

SUMMARY OF THE INVENTION

According to the present invention, the number of the row of information to be selected or obtained access to is selected by row selection wheels while the number of the column by a column selection plate having the same number of apertures with that of columns of information stored in the storage medium. The displacements of these row selection wheels and the column selection plate can be controlled by row and column selection command pulses respectively.

According to one aspect of the present invention, the number of the row of coordinates of desired information can be selected by the row selection wheels which are rotated through a stepping motor to which are applied the row selection command pulses so that the row selection wheels which engage with the perforations of the information storage medium advance a predetermined number of rows. On the other hand, the selection of the number of columns of the information can be made by the column selection plate in the form of one blade or segment which is rotatable about one axis and has a plurality of apertures formed stepwise so as to correspond with the columns of information stored in the storage medium.

According to another aspect of the invention, a two-blade segmental plate may be used in which two blades or segments extend in the opposite directions from the common center of rotation. Therefore, two information elements can be selected simultaneously from two information storage media.

According to still another aspect of the present invention, there may be used a column selection plate which is displaced in the direction of rows, that is the longitudinal direction of the information storage medium.

These and other objects and aspects of the present invention will be better understood upon consideration of the following detailed description and the accompanying drawings.

Figure 1:
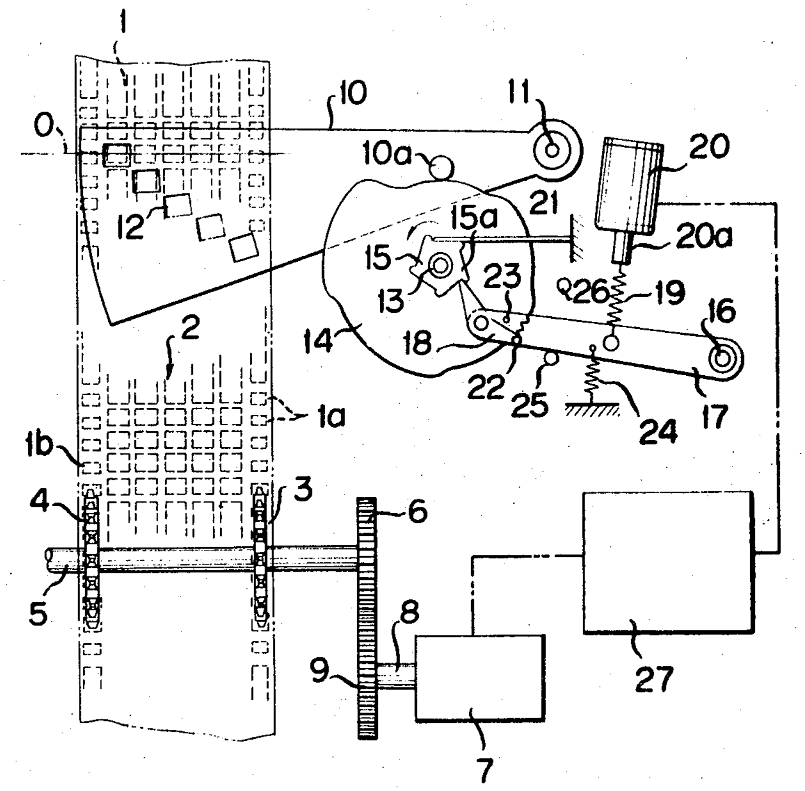
FIG. 1 is a front view of an embodiment of an information selecting device of the present invention.

DESCRIPTION OF THE PREFERRED EMBODIMENTS:

Referring now to FIG. 1, a multitude of information elements are recorded in an information storage medium 1 in suitable size and in rows and columns. Row selection displacement wheels 3 and 4 such as sprocket wheels in engagement with perforations 1*a* and 1*b* of the medium 1 are carried by a shaft 5 which in turn is loosely fixed to a stationary member. Alternately, rollers may be used as row displacement wheels 3 and 4. A toothed wheel 6 is fixedly secured to one end of the shaft 5 and in mesh with a toothed wheel 9 carried by a shaft 8 of a stepping motor 7.

A column selection plate 10 has it one end pivoted by the shaft 11 which in turn is loosely fitted to a stationary member the column selection plate 10 being in closely vertically spaced apart relation with the storage medium 1. The selection plate 10 is provided with the same number of apertures 12 with that of the rows and the dimensions of the aperture 12 are corresponding with those of the information bearing or storing space size upon the medium 1. These apertures 12 are so arranged that when the column selection plate 10 is rotated stepwise about the shaft 11, the axis of each aperture is aligned with a reference line 0. A pin 10*a* extends from a suitable position of the selection plate 10 and is made to press against the cam surface of a cam 14 which is carried by a shaft 13 which in turn is loosely carried by the stationary member. The cam 14 has the same number of cam follower actuating edges with that of the number of the apertures 12. A ratchet wheel 15 is fixed to the shaft 13 so as to rotate the cam 14. A rocking member 17 is pivotable carried by a shaft 16 which in turn is fixedly secured to the stationary member. At the free end of the rocking member 17 is pivotably fixed a pawl 18 which engages with the teeth 15*a* of the ratchet wheel 15. One end of a spring 19 is fixed to a suitable position of the rocking member 17 while the other end thereof is fixed to an actuating rod or plunger 20*a* of an electromagnet 20. The rear end of the pawl 18 is normally biased in the counterclockwise direction by means of a spring 22 one end of which is fixed to the rocking member 17, but the rotation of the pawl 18 is limited by a pin 23 extending from the rocking member 17. One end of a spring 24 is fixed to a suitable position of the rocking member 17 while the other end is fixed to the stationary member and the pivotal motion of the rocking member 17 is limited by pins 25 and 26 both of which extend from the stationary member. With this construction, the cam 14, the rachet wheel 15, the pawl 18 and the rocking member 17 can be accurately actuated by the springs and pins.

Next the mode of operation will be described hereinafter. When the pulse signals are applied to the stepping motor 7 from a command or instruction unit 27, the stepping motor 7 is caused to rotate through a predetermined angle in response to ( a number of) pulses applied thereto so that the row displacement or selection wheels 3 and 4 are rotated whereby a number of rows of the medium 1 are displaced or advanced in response to (the number of) pulses applied to the motor 7. On the other hand, when the pulse signals are applied to the electromagnet 20, it actuates the plunger 20*a* a number of times (corresponding to a number of) pulses applied thereto so that the rocking member 17 is caused to rock the same number of times, whereby respective apertures 12 of the column selection plate 10 are sequentially displaced toward and aligned with the reference line 0 by the cam 14 which is rotated by the ratchet wheel 15 until a predetermined aperture 12 which corresponds to (a number of) pulses applied to the magnet 20 is finally positioned along with the reference line 0. Now, a certain row of the information elements 2 is designated as the first row while the leftmost column, as the first column so that the information stored at the intersection of the selected *m*-th row and *n*-th column may be designated by 2mn. Let it be assumed that the first row is coincident with the reference line 0, then the information 2mn would be selected by advancing the storage medium 1 and rotating the column selection plate 10 by a number of $(m - 1)$ and a number of $(n - 1)$ pulses applied to the stepping motor 7 and the magnet 20 respectively from the command unit 27. The selected information 2mn will be then read out through a suitable optical system (not shown).

The number of row selection pulses is determined depending upon what is the number of the row which coincides with the reference line 0. In a similar manner the number of column-selection pulses is determined depending upon what is the number of the column which coincides with the reference line 0 when the information 2mn is to be selected.

The cam 14 has the same number of cam profiles or follower actuating edges with that of the apertures 12, that is the number of rows of the information, and since these cam profiles or follower actuating edges are continuous, when the cam 14 makes one rotation it returns to its initial position without fail. Therefore, it is possible to select any information stored in the medium 1 by the continuous rotation of the cam 14 by the row selection pulses the number of which will be determined by the relation of number of a row to be selected this time with respect to the number of the previous row selected when the cam 14 has a configuration as described hereinabove.

Figure 2:
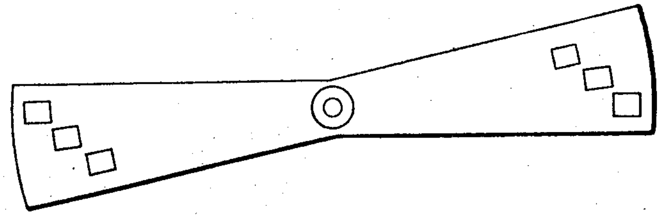
FIG. 2 is a front view of another embodiment of a column selection plate of the information selecting device shown in FIG. 1

It should be understood that the shape of the column selection plate 10 is not limited to what is shown in FIG. 1. For example, a two-blade apertured selection plate as shown in FIG. 2 may be also utilized. This column selection plate rotates about its center and has two aperture groups. When such two-blade column selection plate is used, it will be possible to select the required information from two information storage media which are disposed on both sides of the selection plate.

Figure 3:
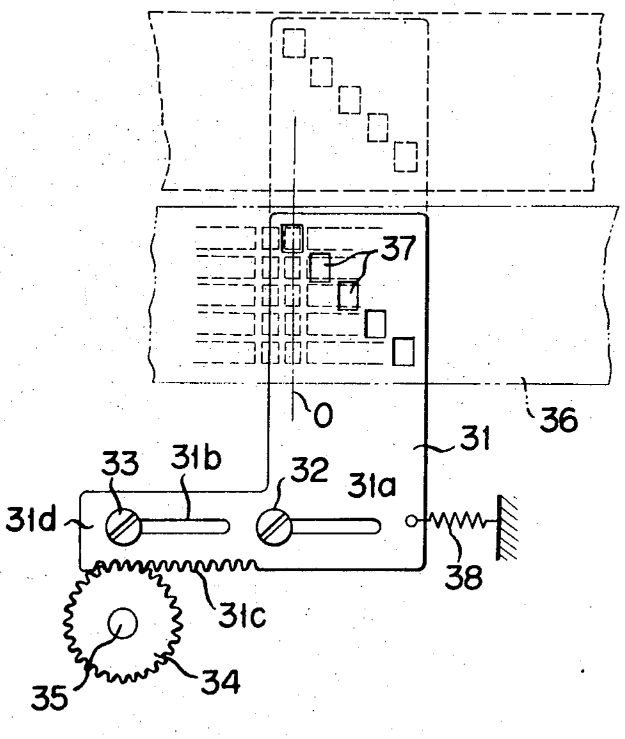
FIG. 3 is a front view of a further embodiment of an information selecting device of the present invention.

FIG. 3 illustrates an L-shaped column selection plate 31 having two elongated slots 31*a* and 31*b* formed at the base portion thereof. Into these slots 31*a* and 31*b* are loosely fitted pins 32 and 33 respectively which in turn are securely fixed to a stationary member. At the side edge of the base portion of the L-shaped selection plate 31 are formed rack-teeth 31*c* which are in mesh with a pinion 34 which is carried by a shaft 35 of a stepping motor. Therefore, the column selection plate 31 is displaced back and forth above an information storage medium 36 by the stepping motor which is rotated through a predetermined angle by a predetermined number of pulses applied thereto so that a predetermined aperture may be positioned so as to be coincident with the reference line 0. The displacement of the column selection plate 31 may be more precisely controlled by a spring 38. Since the information storage medium 36 is displaced a number of rows by row selection wheels (not shown) in response to a number of pulses applied to the stepping motor, the required information stored in the medium may be read out by the combination of the rotation or these row selection wheels and the displacement of the column selection plate (in a similar manner as described hereinabove with reference to FIG. 1). Instead of the rack 31*c* and the pinion 34, the cam 14 shown in FIG. - may be also used in this embodiment. In this case, the end side edge 31*d* of the column selection plate 31 is pressed against the cam surface 14. As a modification, the column selection plate 31 may be extended as shown by broken lines and a plurality of aperture groups may be provided so that a plurality of information may be simultaneously selected and read out.

When a reference point is marked at a suitable position of the storage medium, the error in the advancement of the medium can be detected and corrected by this reference point. For example, the storage medium may be reversed in direction of advancement by a reverse instruction which causes the medium to return by the same number of rows with that of rows advanced by the previous advance command pulses after the selected information has been read out. Furthermore, according to the present invention, a long length of information storage medium such as tape may be used in loop like an endless tape by connecting both ends thereof.

when When the device of the present invention is used as an input device for an electronic computer, the row and column selection pulses may be so applied to the stepping motor that the cam which rotates or displaces the column selection plate stepwise makes one rotation while the information storage medium is advanced one row and stopped. Thus, the information stored in the medium can be scanned in rows and columns and this operation may be cycled. In this case, the selected information may be read out through the apertures by a suitable photoelectric transducer.

The present invention provides the device of the type described having a simple mechanical construction in which the row selection wheels which advance the information storage medium and the column selection plate having a plurality of apertures corresponding to the columns on said medium may be displaced respectively in response to the row and column selection pulses. The present invention therefore offers various advantages such that the high-speed and accurate information selection or access can be effected, a required information can be selected from an endless-tape-like information storage medium without the necessity of special retrieval means, the information access efficiency can be improved and the device is simple in construction.

These advantages will be more obvious when the information column selection plates as shown in FIGS. 2 and 3 are used because a plurality of information may be selected or retrieved simultaneously from a plurality of information storage media by only one mechanism.

The present invention has been described so far with particular reference to the preferred embodiments thereof, but it will be understood that variations and modifications can be effected without departing the true spirit of the present invention as described hereinabove and as defined in the appended claims.

What is claimed is:

1. An information selecting device comprising an information storage medium having information stored in rows and columns;

row selection wheel means for advancing said information storage medium;

a reference line on which one of said rows is selectively located by said wheel means;

column selector plate means mounted to move over said information storage means;

said plate means having a plurality of apertures therein corresponding in number to the number of rows in said information storage means;

a pivot point located on said device;

said plate means mounted to rotate on said pivot point;

said apertures arranged to be spaced along a smooth arcuate line, each said aperture having an axis passing therethrough and passing further through said pivot point, each said axis having an angular relationship with respect to an adjacent axis and an angular relationship with said reference line that decreases to zero as each said aperture and its respective axis is rotated to be in correspondence with said reference line;

motor means for driving said wheel means;

actuating means comprising a cam having a plurality of actuating edges corresponding with said plurality of apertures, said plate means having a fixed pin follower in movable contact with said actuating edges for effecting the pivotal movement of said plate means;

a command pulse unit;

said pulse unit having a first connection to said motor means to drive said motor means in increments corresponding to a first predetermined pulse instruction to position a selected row over said reference line; and said pulse unit having a second connection to said actuating means to drive said pivoted plate means in increments corresponding to a second predetermined pulse instruction to position a selected aperture over said reference line.

* * * * *